Patented Dec. 31, 1935

2,025,957

UNITED STATES PATENT OFFICE 2,025,957

CELLULOSE DERIVATIVE COMPOSITION

George Schneider, Montclair, N. J., assignor to Celanese Corporation of America, a corporation of Delaware No Drawing. Application May 19, 1933, Serial No. 671,825

2 Claims. (Cl. 106—40)

This invention relates to the preparation of compositions containing derivatives of cellulose and relates more particularly to the preparation of organic derivative of cellulose compositions of increased stability.

An object of my invention is to prepare compositions containing derivatives of cellulose which are of increased stability by incorporating therein metallic salts of naphthenic acids as stabilizers. Other objects of this invention will appear from the following detailed description.

Often compositions made of cellulose acetate or other organic derivatives of cellulose do not have as high a stability against the action of heat or other destructive agencies as is desired. Thus when compositions are exposed to relatively high temperatures for substantial periods of time, such for instance as in the pressing of sheets or slabs at elevated temperatures to form blocks, changes of color are liable to occur. These changes of color may be in the form of local spots of lighter color, due to small amounts of acids that may occur or develop during the heating. Again when uncolored or delicately colored stock is block-pressed at elevated temperatures, relatively deep discoloration occurs at the periphery of the resulting block, the degree of discoloration gradually diminishing towards the centre.

I have found that if relatively small amounts of metallic salts of naphthenic acids are incorporated in derivative of cellulose plastics, the change of color due to heating above described is largely or entirely avoided. Moreover articles, coatings and the like made of derivatives of cellulose plastics containing such naphthenates have great stability and long life. Furthermore, contrary to the effect of the addition of most of the stabilizers heretofore proposed, the presence of small quantities of metallic naphthenates does not decrease the clarity or increase the haze of cellulose derivative compositions containing them, and these naphthenates do not impart any color to the compositions upon heating.

In accordance with my invention I prepare compositions containing derivatives of cellulose and metallic salts of naphthenic acids as stabilizers.

Any suitable metallic salt of naphthenic acids may be employed such as the naphthenates of calcium, magnesium, barium, strontium, sodium or potassium. The naphthenates embraced within this invention are the salts of the acid represented by the structural formula

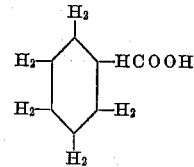

wherein one or more of the hydrogen atoms of the nucleus may be replaced by ethyl, methyl, propyl or other alkyl group, or phenyl or other aryl group. The salts of a mixture of two or more of such naphthenic acids may be employed.

For making the composition containing the naphthenate, there may be employed any suitable derivative of cellulose, such as cellulose nitrate, but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the naphthenates as stabilizer may be made in any suitable manner and they may be worked up into sheets, rods, tubes, blocks or any other desired shape. Molding powder containing the naphthenates, a derivative of cellulose and a suitable plasticizer in intimate association but containing little or no solvent may be made, and these powders may be molded under heat and pressure to any desired shape. Filaments, yarns and other textile materials may be made from solutions containing the organic derivatives of cellulose and the naphthenates by extrusion through orifices into an evaporative atmosphere, as in dry spinning, or into a precipitating bath as in wet spinning.

Solutions of the organic derivative of cellulose in a volatile solvent containing the naphthenates may be cast or extruded onto a smooth surface and the volatile solvent permitted to evaporate to form films that may be used for photographic or other purposes. Another application of this invention is in the preparation of laminated glass wherein a plastic sheet containing the derivative of cellulose and the naphthenates is interposed between sheets of glass. Coating compositions such as lacquers may be formed containing the naphthenate and the derivative of cellulose dissolved in appropriate solvent mixtures, and resins, either synthetic or natural, compatible with the derivative of cellulose may be added thereto.

The proportion of the naphthenates to the derivative of cellulose may be varied in accordance with the particular requirements. Generally I have found that in the case of its use with cellulose acetate, naphthenates may be employed in relatively small amounts say from 0.01 to 0.3% of the weight of the cellulose acetate.

In making the compositions in accordance with my invention, there may be incorporated any desired plasticizers such as triphenyl phosphate, triacetin, dibenzyl tartrate, diethyl tartrate, dibutyl tartrate, diethyl phthalate, ethyl toluene sulfonamide.

In making these compositions, solvents of appropriate nature, such as acetone, methyl acetate, ethyl acetate, ethylene formal, ethyl lactate, formal glycerol, diacetone alcohol, of varying boiling points may be used to suit the particular requirements. Effect materials such as pigments, filling materials or dyes may be added to produce any desired effect.

In order further to illustrate my invention, but without being limited thereto, the following specific example is given.

Example

The following ingredients are kneaded together at elevated temperature in a suitable mixing apparatus:

| | Parts by weight |
|---|---|
| Cellulose acetate | 100 |
| Ethyl paratoluene sulfonamide | 25 |
| Triphenyl phosphate | 12.5 |
| Dimethyl phthalate | 2.5 |
| Calcium naphthenate | 0.05 | together with the required amount of volatile solvent, which solvent may be made by mixing 3 parts of acetone with 1 part of ethyl acetate and one part of ethyl alcohol. Pigments, dyes or lakes may be incorporated to impart the desired color.

The resulting dough-like mass is then worked up in the ordinary manner between heated malaxating rolls to form sheets or slabs which are then stacked and pressed under elevated temperatures to form a block, which may then be sheeted or worked up into any desired form.

If a cellulose acetate which normally causes "acid spotting" is employed, the product formed is entirely free of such spots. Moreover when no coloring material is employed or a delicately colored product is made, the resulting articles are entirely free of the discoloration caused by the heat of block-pressing cellulose acetate compositions that do not contain the naphthenate. Moreover the product is free of discolorations that are caused by the use of stabilizers previously proposed, and its clarity is not impaired by the presence of the naphthenate.

It is to be understood that the foregoing detailed description is given merely by way of illustration and many variations may be made therein without departing from the spirit of my invention.

Having described my invention, what I desire to secure by Letters Patent is:

1. A plastic composition containing cellulose acetate and a metallic salt of a naphthenic acid in amounts of 0.01 to 0.3% of the weight of the cellulose acetate present, which composition is substantially resistant to discoloration by the action of heat.

2. A plastic composition containing cellulose acetate and calcium naphthenate in amounts of 0.01 to 0.3% of the cellulose acetate present, which composition is substantially resistant to discoloration by the action of heat.

GEORGE SCHNEIDER.